United States Patent Office 3,330,842
Patented July 11, 1967

3,330,842
INTERMEDIATES IN THE PRODUCTION OF CEPHALOSPORIN C AND DERIVATIVES THEREOF
William Graham, 44 Wedmore Road, Greenford, England
No Drawing. Filed Nov. 28, 1962, Ser. No. 240,726
Claims priority, application Great Britain, Nov. 29, 1961, 42,735/61
15 Claims. (Cl. 260—349)

The present invention relates to intermediates of use in the production of cephalosporin C and derivatives thereof by chemical methods and to the production of such intermediates.

Cephalosporin C possesses antibiotic activity in some respects similar to that of the penicillins. However, it appears not to be attacked by penicillinase, an enzyme which breaks down penicillins, and cephalosporin C and derivatives thereof are thus of value in the treatment of various conditions caused by penicillinase-producing organisms, particularly infections produced by penicillin-resistant staphylococci.

Cephalosporin C has the following structure:

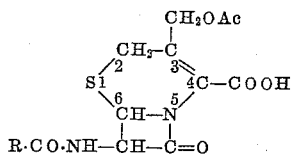

(where R is the residue

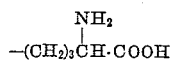

and Ac is an acetyl residue). As in the case of the penicillins variation of the nature of the residue R gives rise to derivatives of cephalosporin C having varying antibiotic activities and some of such derivatives are important. It is thus useful to obtain 7-amino-cephalosporanic acid (that is cephalosporin C having a free —NH$_2$ group instead of the —NH.CO.R group) and acyl derivatives thereof other than cephalosporin C itself.

The production of cephalosporin C by fermentation appears at present to give rise to difficulties and there is thus considerable interest in achieving a chemical synthesis of this substance.

Copending U.S. application No. 100,506, now Patent No. 3,231,571, describes a synthesis of cephalosporin C in which certain 3-amino-propane-1-thiol derivatives are reacted with an aldehyde R.CHO in which R represents the group

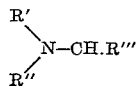

where the groups R' and R" are groups which protect the N atom, e.g. a hydrogen atom and an acyl group or triphenylmethyl group or the two carbonyl groups of the phthaloyl group and R''' is an ester group, the group R being subsequently modified to form the required cephalosporin C structure.

One useful 3-amino-propane-1-thiol derivative which may be reacted with the aldehyde R—CHO according to Application No. 100,506 possesses the general formula:

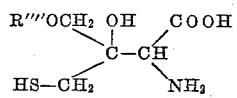

where R'''' is a hydrogen atom or an acyl group.

An object of the present invention is to provide novel intermediates and processes useful for research into the synthesis of the above compound I.

The new intermediates according to the invention possess the formula:

$$R^1.COO.CH_2.CO.CH_2S.R^2 \quad\quad II$$

where $R^1$ represents an aliphatic, araliphatic or aryl group and $R^2$ represents an aliphatic, araliphatic, aryl, nitrile or other protective group which can be replaced by hydrogen e.g. by hydrolysis or hydrogenolysis.

There are now described by way of example only several synthetic routes for the conversion of compounds of Formula II to compounds of Formula I.

One route for conversion of compounds of Formula II to compounds of Formula I is as follows:

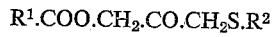
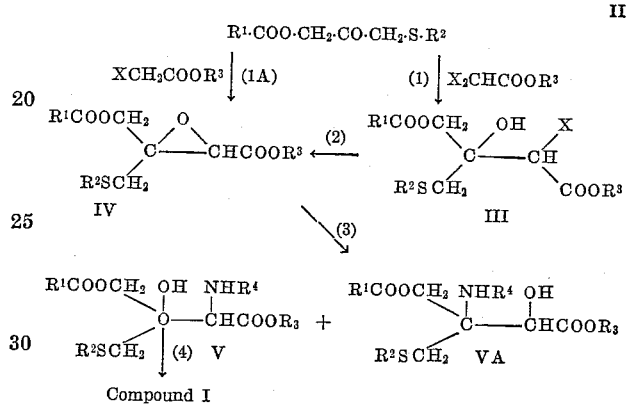

Compound I where $R^1$ and $R^2$ have the above meanings, $R^3$ is an alkyl or aralkyl group, $R^4$ is a hydrogen atom or an alkyl or aralkyl group and X is a halogen atom.

Stage (1) of the above sequence can be effected by a form of the method of Darzens (Compt. rend. 1910, 151, 883; 1936; 203, 1374 and 1937, 204, 272) in which an aldehyde or ketone is reacted with a dihaloacetic acid ester in the presence of dilute magnesium amalgam. It has been found that, in spite of the presence of sulphur in the molecule which might have been expected to react with the amalgam and in spite of the bulky groups attached to the keto-group, compound II reacts with dihaloacetic esters such as ethyl dibromo- or dichloroacetate in the presence of magnesium amalgam to give good yields of compound III. The dibromo acetate also reacts with compound II in good yield in the presence of zinc amalgam.

Stage (2) yielding the glycidic ester IV takes place according to the method of Darzens, by reaction of compound III with a basic substance, for example, an alkali metal alkoxide such as sodium ethoxide. Compound IV may also be prepared according to the more usual form of the Darzens reaction by reacting compound II with a mono-haloacetic acid ester as in stage (1A) above.

In stage (3) the compound of Formula IV is converted to a mixture of the isomeric aminoalcohols (V and VA) by reaction with ammonia or a primary amine or with sodium azide followed by reduction, e.g. with chromous chloride. It is not necessary to convert the halohydrin III into the glycidic ester IV in a separate step since this reaction may be effected by reaction of the halohydrin with ammonia or a primary amine or sodium azide; halohydrin III may thus be converted into aminoalcohols V and VA in a single reaction step. It has been found, however, that the conversion of the halohydrin III to the aminoalcohols V and VA always takes place by way of glycidic ester IV.

Aminoalcohols V and VA may be separated in any convenient manner e.g. by chromatography or separation on ion exchange resins or by fractional crystallisation of the zinc or copper salts, and the desired aminoalcohol V converted in stage (4) to the desired compound I, or its ethers or esters, required for reaction with the compound R.CHO according to application No. 100,506 by appropriate hydrolysis to remove some or all of groups $R^1$, $R^2$, $R^3$ and $R^4$. Alternatively, the aminoalcohols V and VA need not be separated prior to stage (4), and the desired compound I separated from the β-amino-α-ol-isomer after hydrolysis.

Another method for converting the new intermediates according to the invention involves condensation with triphenylcarboethoxy-methylidene phosphorane (Wittig Reagent) to yield a crotonic ester of the formula

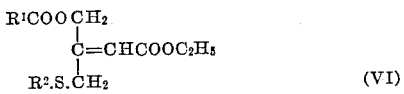

(in which $R^1$ and $R^2$ have the meanings defined above) and conversion of the α,β-unsaturated ester to the α-amino-β-hydroxy compound, for example by a reaction sequence involving the initial addition of mercuric acetate in methanol (Organic Syntheses, 20, 81; Abderhalden and Heyns, Berichte, 1934, 67, 570 and Botvinnick, Z. Physiol, Chem., 1938, 251, 164) or involving the initial addition of bromine (Wood and Vigneaud, J. Biol. Chem., 1940, 134, 413) to the unsaturated ester and conversion of the ester thus formed into an α-amino compound.

The condensation of the compound of Formula II with the Wittig reagent may be effected in any desired manner, e.g. in the presence of a solvent such as methylene chloride or ethyl alcohol at room temperature or benzene at the boiling point. The Wittig reagent may be formed in situ or be preformed and we prefer to use the preformed reagent made, for example, according to the method of Isler (Isler et al., Helv. Chim. Acta, 1957, 40, 1242).

In a modification of this procedure the new intermediate of Formula II may be condensed with a phosphonate carbanion of the formula

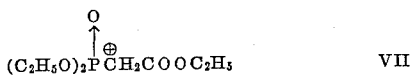

according to the method of Wadsworth and Emmens (Wadsworth and Emmens, J.A.C.S., 1961, 83, 1733).

Yet another procedure for the preparation of the compounds of Formula I from the new intermediates according to the invention involves condensation with a mixed anhydride and coupling of the resultant lactone with a diazonium salt followed by opening of the lactone ring according to the method of Khaimov (Khaimov, Trudy, Tactztik, Sel'skokhoz Inst., 1958, 1, 19) and is illustrated, for example, in the following reaction sequence.

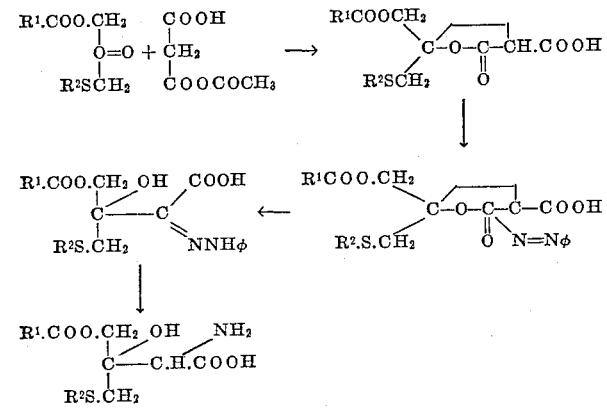

(in which $R^1$ and $R^2$ have the meanings defined above).

Compounds of Formula II which we have found to be particularly suitable are:

3-benzoyloxy-1-thiocyano-propan-2-one,
3-benzoyloxy-1-benzylthio-propan-2-one,
3-benzoyloxy-1-acetylthio-propan-2-one,
3-benzoyloxy-1-p-nitrobenzylthio-propan-2-one,
3-benzoyloxy-1-triphenylmethylthio-propan-2-one, and
3-benzoyloxy-1-p-methoxybenzylthio-propan-2-one.

Compound II may be prepared in any convenient way, advantageousssly according to a process comprising a further feature of the invention in which an α-haloketone of the general formula:

$$R^1.CO.O.CH_2.CO.CH_2.X \qquad \text{VIII}$$

where $R^1$ and X have the meanings given above is reacted with a compound $R^2$—S—H or a metal, e.g. alkali metal, derivative thereof, where $R^2$ has the above meaning. The compound $R^2SH$ is preferably an aralkane (e.g. toluene)-ω-thiol but other —SH compounds or salts thereof, for example ethyl thiol or potassium thiocyanate are also suitable. The reaction is preferably carried out in the presence of a solvent, e.g. an inert solvent such as ether, tetrahydrofuran etc., advantageously under basic conditions, e.g. in the presence of a strong organic base such as triethylamine or trimethylamine. Thus, for example, toluene-ω-thiol reacts well in solution in ether or tetrahydrofuran in the presence of triethylamine.

Compound VIII is also a new compound and constitutes a further feature of the present invention. This compound may be made in any convenient way, advantageously by a further process according to the invention in which a compound of general formula:

$$R^1.CO.O.CH_2.CO.CH_3 \qquad \text{IX}$$

where $R^1$ has the above meaning, is halogenated at the terminal methyl group. The halogenating agent is conveniently free halogen, e.g. bromine. Convenient bromination conditions are those of Diels and Stephen (Ber. 42, 1788). It has been found that there is some formation of the isomer of compound VIII in which the halogen atom is on the 3-carbon atom and that the isomers are advantageously separated, e.g., by physical methods such as fractional crystallisation or distillation. Where $R^1$ is a phenyl group, it has been found that the bromo derivatives may be separated by trituration with petroleum ether followed by crystallisation from methanol.

Compound IX may be prepared, for example, by reaction of mono-bromo acetone with a salt of the acid $R^1COOH$, e.g., an alkali metal salt of an aromatic acid, for example potassium benzoate. Preferably, 2.0 moles of potassium benzoate are reacted with each mole of mono-bromo acetone in refluxing acetone for a prolonged period, e.g., about 4 hours. Monobromo-acetone may be prepared by the method given in Organic Syntheses, Collective Volume II, page 88.

In order that the invention may be well understood I give the following examples by way of illustration only:

*Example 1*

(a) Bromo-acetone (13.7 g., 0.1 mole) in acetone (100 ml.) was heated under reflux for 4 hrs. with potassium benzoate (32 g., 0.2 mole). The insoluble inorganic material was removed by hot filtration and the bed washed with acetone (3× 25 ml.). The washes were combined with the filtrate and acetone was removed from the resulting solution by distillation using a steam bath. The residue in ether (100 ml.) was vigorously shaken with an aqueous solution of sodium metabisulphite (15 g. in 25 ml. of water) for 1 hr. and then allowed to stand at room temperature overnight. The precipitated solid was filtered off, washed with ether (100 ml.) and then dissolved in water (200 ml.). The aqueous solution was acidified with concentrated hydrochloric acid (50 ml.) and warmed to 40° for 10 minutes in order to complete the decomposition. The oil that precipitated was taken up in methylene chloride (25 ml.), the two layers were separated and the aqueous phase re-extracted with methylene chloride (3× 25 ml.). The organic phases were bulked and the resulting solution washed with water (1× 50 ml.), saturated aqueous sodium bicarbonate solution (1× 50 ml.) and water (1× 50 ml.). The solvent was removed by distillation using a steam bath and the residue was distilled under reduced pressure to give 1-benzoyloxypropan-2-one (12.0 g., 67.5% of theory based on bromo-acetone), B.P. 116°/1.5 mm. Hg $n_D^{20}$ 1.5224.

(b) *Without bisulphite purification.*—Bromo-acetone (1.106 kg.) in acetone (8 l.) was heated under reflux with stirring, with potassium benzoate (2.42 kg.) for 4 hours. The reaction mixture was allowed to stand overnight at room temperature. The solid was filtered off and washed with hot acetone (2× 1.5 l.). The filtrate and washings were combined and the solvent then removed under reduced pressure. After clarifying by filtration the residue was distilled at 0.5 mm. to give 1-benzoyloxypropan-2-one (886 g., 61.7% of theory based on bromo-acetone), B.P. 90–105°/0.2–0.5 mm., $n_D^{20}$ 1.5200–1.5220.

Example 2

Benzoyloxy-acetone (17.8 g., 0.1 mole) in chloroform (20.0 ml.) was warmed to 45° and treated dropwise with a solution of bromine (16.32 g., 102 moles) in chloroform (5.0 ml.) over a period of 10 minutes. After an initial induction period (1 minute) the colour was discharged instantaneously. The reaction mixture was poured into water (200 ml.) and extracted with chloroform (100 ml.). The chloroform layer was separated and the aqueous layer extracted with chloroform (2× 50 ml.). The combined organic layers were washed with water (100 ml.), saturated aqueous sodium bicarbonate solution (100 ml.) and water (100 ml.). The solvent was removed by distillation under reduced pressure and the residue was triturated with petroleum ether (B.P. 60–80°, 100 ml.). The solid was filtered off, washed with petroleum ether (B.P. 60–80°, 2× 20 ml.) and dried in a vacuum desiccator to give 12.68 g. of solid which was recrystallised from methanol (20 ml.) to give 3-benzoyloxy-1-bromopropan-2-one:

1st crop 3.95 g., M.P. 82–85°; 2nd crop 0.70 g., M.P. 82–85°—18% of theory.

Infra-red examination showed benzoate band at 1732 and 1276 cm.$^{-1}$ but no bands due to a —COCH$_3$ group. Found: C, 46.62; H, 3.59; Br, 30.8. $C_{10}H_9O_3Br$ requires H, 3.54; Br, 31.13.

The mother liquors from the trituration were concentrated and allowed to stand at room temperature. The precipitated solid was filtered off, washed with a little cold petroleum ether (5 ml.) and dried in a vacuum desiccator to give 1-benzoyloxy-1-bromopropan-2-one (11.63 g., 45%), M.P. 50–52°.

Infra-red examination showed benzoate bands at 1752 and 1242 cm.$^{-1}$, —COCHBr band at 1736 cm.$^{-1}$ and COCH$_3$ band at 1358 cm.$^{-1}$.

Example 3

To 3-benzoyloxy-1-bromo-propan-2-one (1.285 g., 0.005 mole) in tertahydrofuran (20 ml.) was added triethylamine (0.55 g., 0.0055 mole) with stirring. Toluene-ω-thiol (0.682 g., 0.0055 mole) was added and the reaction completed at room temperature for ½ hour with continuous stirring. The triethylamine hydrobromide, which precipitated during the reaction period, was filtered off and washed with a little tetrahydrofuran. The filtrate was concentrated as far as possible under reduced pressure (15 mm.). The residual gum was dissolved in ether (20 ml.) and shaken with an aqueous saturated solution of sodium metabisulphite (10 ml.). No solid precipitated. The layers were separated, the organic layer washed with wate (4× 20 ml.) and then dried over anhydrous magnesium sulphate. The solvent was distilled off under reduced pressure and the residue dried in a vacuum desiccator to leave a wax-like solid (1.45 g., M.P. 46–52°). This material was triturated with cyclohexane, the solid filtered off and dried to give 3-benzoyloxy-1-benzylthiopropan-2-one (1.02 g., 68%), M.P. 52–55°. Found: C, 67.75; H, 5.43; S, 10.28. $C_{17}H_{16}O_3S$ requires C, 68.0; H, 5.3; S, 10.7.

Example 4.—3-benzoyloxy-1-thiocyano-propan-2-one 3-benzoyloxy-1-bromo-propan-2-one (5.14 g.) was dissolved in a solution of potassium thiocyanate (1.94 g.) in acetone (50 ml.). The mixture was boiled under reflux for 5 minutes, cooled, then poured into water. Organic material was extracted with ethyl acetate and the extract dried and evaporated to yield a pale brown solid (4.21 g.), M.P. 70–73°. For analysis a sample was recrystallised from a mixture of ethyl acetate/petroleum ether (B.P. 60–80°) as colourless needles, M.P. 73–74°. Found: C, 55.8; H, 3.8; N, 5.5; S, 13.7. $C_{11}H_9NO_3S$ (M.W. 235) requires: C, 56.1; H, 3.9; N, 5.9; S, 13.6%.

Example 5

(a) *3'-benzoyloxy - 2' - keto-propyl-thiouronium bromide.*—The bromoketone (5.14 g.) thiourea (1.52 g.) and ethyl alcohol (10 ml.) were heated under reflux for 25 minutes. After cooling, the product (6.03 g.), M.P. 228–230° was collected by filtration.

(b) *3' - benzoyloxy-2'-keto-propyl - isothiourea.*—The above thiouronium bromide (8.7 g.) was suspended in ethyl acetate (150 ml.) and shaken with saturated sodium bicarbonate (100 ml.) for 10 minutes. The layers were then separated, the aqueous layer re-extracted, and the combined organic phases washed (H$_2$O), dried and evaporated to yield a white solid (5.94 g.), M.P. 147–151°. For analysis a sample was recrystallised from ethyl alcohol as colourless needles, M.P. 155–159°. Found: N, 11.2; S, 13.0. $C_{11}H_{12}N_2O_3S$ (M.W. 252) requires N, 11.1; S, 12.7%.

Example 6.—3-benzoyloxy-1-benzylthio-propan-2-one

The bromoketone (10.28 g.), potassium thiobenzoate (7.04 g.) and acetone (100 ml.) were boiled under reflux for 20 minutes. After cooling, the mixture was filtered and the filtrate evaporated in vacuo. The resulting solid was washed (H$_2$O) and after drying (60°) gave crude product (12.15 g.), M.P. 118–120°. This was recrystallised from ethyl alcohol and gave the thiobenzoate as colourless needles (11.20 g.), M.P. 119–122°. Found: C, 64.4; H, 4.3; S, 9.91. $C_{17}H_{14}O_4S$ (M.W. 314) requires: C, 64.8; H, 4.5; S, 10.2%.

Example 7.—1-acetylthio-3-benzoyloxy-propan-2-one

To a solution of sodium (3.4 g.) in ethanol (220 ml.) was added thioacetic acid (11 ml.) and bromoketone (38 g.). The mixture was set aside in the refrigerator for 2 hours, then filtered, and the filtrate boiled under reflux for 10 minutes. Solvent was removed in vacuo then water and ether added to the residue. The ether extract was washed (H$_2$O, bicarbonate) and dried and evaporated to yield an oil which solidified on cooling (35 g., M.P. 41–44°). This substance deteriorates on keeping, but is stable after recrystallisation from ethyl alcohol to give colourless needles (25 g.), M.P. 43–45°. The analytical sample, prepared by recrystallisation from ether at low temperature, was obtained as needles, M.P. 44–45.5°. Found: C, 56.6; H, 4.8; S, 12.9. $C_{12}H_{12}O_4S$ (M.W. 252) requires: C, 57.0; H, 4.8; S, 12.7%.

Example 8.—3-benzoyloxy-1-p-nitrobenzylthio-propan-2-one

The bromoketone (12.85 g.) in tetrahydrofuran (100 ml.) was treated with triethylamine (6.85 ml.) followed by a solution of p-nitrotoluene-ω-thiol (8.64 g.) in tetrahydrofuran (50 ml.). The mixture was set aside for 1.25 hours, then filtered, the filtrate evaporated and the residue dissolved in a mixture of ethyl acetate and ether. The solution was washed (H$_2$O), dried and evaporated to yield an oil which solidified on cooling, to a pale brown mass (16.49 g.). M.P. 59–70°. This was recrystallised from acetone at —70° to give pale yellow needles (7.1 g.), M.P. 83–84°. The analytical specimen was obtained as pale yellow plates, M.P. 84–86°, by recrystallisation from an acetone-petroleum ether (B.P. 40–60°) mixture.

Found: C, 59.0; H, 4.3; S, 8.9. $C_{17}H_{15}NO_5S$ requires C, 59.1; H, 4.4; S, 9.3%.

*Example 9.—3-benzoyloxy-1-triphenylmethylthio-propan-2-one*

A solution of triphenylmethanethiol (27.6 g.) in tetrahydrofuran (220 ml.) was added dropwise during 5 minutes to a stirred solution of bromoketone (25.7 g.) and triethylamine (12.1 g.) in tetrahydrofuran (220 ml.). Water cooling was applied and after 1 hour the mixture was filtered and the filtrate concentrated in vacuo. The product was poured into ice-water, and extracted with ether. The extract was washed ($H_2O$), dried and evaporated. The oil was dissolved in ethyl acetate (300 ml.). Nuchar (5 g.) was added and the mixture allowed to stand for 16 hours. The charcoal was removed, the filtrate concentrated, then petroleum ether (B.P. 40–60°) added. After refrigeration the solid (32.0 g.), M.P. 76–78° was collected. Further recrystallisation from the same solvent gave material (27.0 g.), M.P. 40–45° (solvated), which was dissolved in isopropyl ether, the solid recovered by evaporation and the residue triturated with petroleum ether. In this way colourless needles (21.0 g.), M.P. 76–78° were obtained. Found: C, 76.9; H, 5.5; S, 6.6. $C_{29}H_{24}O_3S$ (M.W. 452) requires C, 77.0; H, 5.3; S, 7.1%.

*Example 10.—3-benzoyloxy-1-p-methoxybenzylthio-propan-2-one*

The bromoketone (8.35 g.) and triethylamine (4.55 ml.) were dissolved in tetrahydrofuran (65 ml.). To this solution was added dropwise a solution of p-methoxy-toluene-ω-thiol (5.0 g.) in tetrahydrofuran (65 ml.), with stirring. Addition took 5 minutes and the temperature was held at 25° with external cooling. After a further 25 minutes the solution was filtered, evaporated somewhat, then diluted into water and extracted with ether. The extract was washed ($H_2O$), dried, and evaporated, and the resulting solid recrystallised from methanol. The product (6.10 g.), M.P. 57–58°, was recrystallised from the same solvent for analysis and gave colourless needles, M.P. 56–57°. Found: C, 65.2; H, 5.6; S, 9.9. $C_{18}H_{18}O_4S$ (M.W. 330) requires C, 65.5; H, 5.5; S, 9.7%.

*Example 11*

Mercury (21.85 g.) and magnesium filings (0.437 g.) were amalgamated under an atmosphere of hydrogen by heating with stirring at 160° for 10 minutes. The amalgam was allowed to cool to room temperature under an inert atmosphere (hydrogen) and a solution of 3-benzoyloxy-1-benzylthio-propan-2-one (5.0 g., 0.167 mole) and ethyl dichloroacetate (2.62 g., 0.0167 mole) in sodium dried ether (35 ml.) added as a single charge. The reaction mixture was stirred at room temperature for 3 hours, with external cooling in the early part of the reaction when the solvent started to reflux.

The grey suspension was removed by filtration and the filtrate was acidified with aqueous acetic acid (7 ml. of acid in 50 ml. water). The aqueous layer was run off and extracted with ether (2× 20 ml.). The ethereal solution was combined with the extracts and the resulting solution washed with water (2× 25 ml.), saturated aqueous sodium bicarbonate solution (1× 25 ml.) and water (1× 25 ml.) and dried over anhydrous magnesium sulphate. The ether was distilled off under reduced pressure to leave ethyl 2-chloro-3-hydroxy-3-benzylthiomethyl-4-benzoyloxybutyrate as a pale yellow heavy oil (4.46 g., 63.4% of theory). Found: C, 60.99; H, 5.49; Cl, 8.23; S, 8.63. $C_{21}H_{23}O_5ClS$ requires C, 59.7; H, 5.45; Cl, 8.41; S, 7.58. Infra-red examination showed benzoate bands at 1742 and 1274 cm.$^{-1}$ and a hydroxyl band at 3440 cm.$^{-1}$.

*Example 12*

Granulated zinc (1.06 g.) and mercury (53.0 g.) were amalgamated as described in Example 11. The cold amalgam was reacted with 3-benzoyloxy-1-benzylthio-propan-2-one (5.0 g.) and ethyl dibromoacetate (4.1 g.) in ether (25 ml.) at room temperature for 22 hrs. The total reaction mixture was acidified with water (50 ml.) containing acetic acid (7 ml.) and the product isolated as in Example 11 to give ethyl 2-bromo-3-hydroxy-3-benzylthiomethyl-4-benzoyloxy-butyrate as a pale yellow oil (6.58 g., 84% theory). Found: Br, 13.3%; S, 7.76%. $C_{21}H_{23}O_5BrS$ requires Br, 17.1%; S, 6.85%. Infra-red examination showed benzoate bands at 1730 and 1268 cm.$^{-1}$ and a hydroxyl band at 2450 cm.$^{-1}$.

*Example 13*

Example 11 was repeated using the same ketone (5 g.) but (1) ethyl dibromoacetate (4.1 g.) was substituted for ethyl dichloroacetate, (2) the reaction concentration was more dilute (50 ml. of ether) and (3) the reaction time was extended to 5 hours, to give ethyl 2-bromo-3-hydroxy-3-benzylthiomethyl-4-benzoyloxybutyrate as a pale yellow oil (7.01 g., 90% of theory). Found: C, 54.42; H, 4.68; S, 6.70; Br, 16.02. Active H, 0.21. $C_{21}H_{23}O_5BrS$ requires C, 54.0; H, 4.93; S, 6.85; Br, 17.15. Active H, 0.214. Infra-red examination showed benzoate band at 1720 and 1275 cm.$^{-1}$ and a hydroxyl band at 3500 cm.$^{-1}$.

*Example 14*

An amalgam was made, as described in Example 11, from magnesium (1.875 g.) and mercury (93.75 g.). A solution of benzylthio-acetone (13.5 g.) and ethyl dibromoacetate (18.45 g.) in dried ether (75 ml.) was added and the reaction completed by stirring under an inert atmosphere for 2 hrs. The reaction mixture was decomposed with aqueous acetic acid and the crude oily product (25 g.) isolated as in Example 11.

This material was heated at 90° under vacuum (0.1 mm.) for 2 hrs. to remove unreacted bromo-ester and to give ethyl 2-bromo-3-hydroxy-3-benzylthiomethyl-butyrate (19 g., 73% theory). Found: Br, 21.75%; S, 10.11%. $C_{14}H_{19}O_3BrS$ requires Br, 23.1%; S, 9.2%.

*Example 15*

An amalgam between magnesium (2.5 g.) and mercury (125 g.) was made as described in Example 11. A solution of benzoyloxyacetone (17.8 g., 0.1 mole) and ethyl dichloroacetate (15.6 g., 0.1 mole) in dry ether (100 ml.) was added and the reaction allowed to proceed over 6 hrs. at room temperature. The crude oily product (26 g.) was isolated as described in Example 11.

The product was distilled under vacuum and the fraction boiling 154–157°/0.2 mm. was collected. The yield of ethyl 2-chloro-3-hydroxy-3-benzoyloxy butyrate amounted to 8.5 g. (32.7% of theory). Found: C, 57.68; H, 5.89; Cl, 9.54. Calcd. for $C_{15}H_{17}O_5Cl$ C, 55.8; H, 6.67; Cl, 11.8%.

*Example 16*

An amalgam between mercury (87.4 g.) and magnesium filings (1.748 g.) was made as described earlier and then reacted with 3-benzoyloxy-1-benzylthiopropan-2-one (20 g.) and t-butyl dibromoacetate (18.32 g.) in ether (200 ml.) as described in Example 11.

The grey suspension was filtered off and the solid resuspended in ether (100 ml.) and aqueous acetic acid (28 ml. acid in 200 ml. water) added. The layers were separated and the product isolated as before, to yield crude t-butyl 2-bromo-3-hydroxy-3-benzylthiomethyl-4-benzoyloxy-butyrate as a pale yellow oil (19.17 g., 60% of theory). Analysis found Br, 8.31%; S, 7.81%.

$C_{23}H_{27}O_5BrS$ requires Br, 16.15%; S, 6.45%. Infra-red examination showed benzoate bands at 1730 cm.$^{-1}$ and 1275 cm.$^{-1}$ and bonded hydroxyl band at 3480 cm.$^{-1}$.

*Example 17*

Ethyl 2-bromo-3-hydroxy-3-benzylthiomethyl-4-benzoyloxy-butyrate (15.57 g.) in absolute alcohol (93.5 ml.)

was reacted with sodium azide (4.35 g.) in water (18.6 ml.) by boiling under reflux for 5½ hours. The resulting solution was cooled to room temperature and poured into saturated sodium bicarbonate solution (200 ml.). The product was extracted into ether (1× 200 ml., 3× 100 ml.), the ether extracts were bulked, the resulting solution was washed with water (3× 200 ml.) and then dried over anhydrous magnesium sulphate. The solvent was distilled off under reductd pressure to leave a residue containing ethyl 2-azido-3-hydroxy-3-benzylthiomethyl-4-benzoyloxy-butyrate (12.85 g., 90% theory). Found: S, 8.39%; N, 5.18%; Br, 0.0%. $C_{21}H_{23}O_5N_3S$ requires S, 7.45%; N, 9.78%. Infra-red examination showed benzoate bands at 1730 and 1268 cm.$^{-1}$, a hydroxyl band at 3450 cm.$^{-1}$ and an azide band at 2100 cm.$^{-1}$.

*Example 18*

Crude ethyl 2 - azido - 3-hydroxy-3-benzylthiomethyl-4-benzoyloxy-butyrate (19.47 g.) in acetone (100 ml.) was treated, under an inert atmosphere of carbon dioxide, with a 2.38 N chromous chloride solution (40.0 ml.). The reaction mixture was extracted with ether (3× 200 ml.). The extracts were bulked and the resulting solution was back-washer with water (1× 50 ml.). The ether layer was extracted with 10 N sulphuric acid (3× 30 ml.). The acid layers were bulked and back-washed with ether (1× 30 ml.). The aqueous phase was covered with ether (150 ml.) and neutralised to pH 7 with saturated sodium carbonate solution. The layers were separated and the aqueous phase re-extracted with ether (2× 150 ml.). The ether layers were then bulked, washed with water (1× 100 ml.) and dried over anhydrous magnesium sulphate. The solvent was distilled off under reduced pressure to leave ethyl 2 - amino - 3 - hydroxy-3-benzylthiomethyl-4-benzoyloxy-butyrate as a brown oil (2.87 g., 16% theory). Found: N, 3.33%. $C_{21}H_{25}O_5NS$ requires N, 3.48%. Infra-red examination showed benzoate bands at 1730 and 1280 cm.$^{-1}$ hydroxyl and/or amine band at 3420 cm.$^{-1}$.

A sample of the base in 80% alcohol was run through an ion-exchange column (Zeocarb 225/H$^+$ form) and produced a fraction (12%) shown to be neutral by electrophoresis, and a basic fraction (55%) eluted with hydrogen chloride in aqueous alcohol. The basic material gave a white solid when treated with oxalic acid in ether. The oxalate, after crystallisation from ethyl acetate/ether, showed C, 54.86%; H, 5.53%; N, 2.81%; S, 6.51%; $C_{23}H_{17}O_9NS$ requires C, 56.0%; H, 5.48%; N, 2.84%; S, 6.49%.

*Example 19*

(a) *The preparation of triphenyl carboethoxymethylidene phosphorane.*—This was prepared by the method of Isler et al (Isler et al., Helv. Chim. Acta, 1957, 40, 1942). The substance was recrystallised from an ethyl acetate, 40–60° petroleum ether mixture as needles, M.P. 122–127°. Found: C, 75.4; H, 6.2; P, 8.6. $C_{22}H_{21}O_2P$ (M.W. 348) requires C, 75.8; H, 6.1; P, 8.9%.

(b) *Ethyl γ-acetylthio-β-benzoyloxymethyl-crotonate.*—1-acetylthio-3-benzoyloxy-propan-2-one (10.1 g.) and the Wittig reagent (13.9 g.) were boiled under reflux for 2 hours with dry benzene (100 ml.), maintaining an atmosphere of nitrogen. The solvent was removed under reduced pressure, the residue stored at 0° for 16 hours, then ether (30 ml.) added. The precipitate of triphenylphosphine oxide (9.3 g.) was removed and the filtrate taken to dryness. The resulting oil (which decomposed upon attempted distillation) was dissolved in a mixture of carbon tetrachloride (18 ml.) and 60–80° petroleum ether (12 ml.). The solution was applied to a column of silica gel (290 g.) which had been prepared in the same solvent mixture. Elution gave: the same solvent (500 ml.), an oil (0.25 g.); to a carbon tetrachloride 60–80° petroleum ether mixture (3:1 v./v.; 450 ml.), an oil (0.20 g.); and to carbon tetrachloride-methylene chloride (50:50 v./v.; 1 litre) the product as a colourless oil (11.1 g.). Further elution with ether gave an oil (1.16 g.).

The product gave the following analysis: C, 59.9; H, 6.0; P, 0.0; S, 10.3; OEt, 13.3%. $C_{16}H_{18}O_5S$ (M.W. 322) requires C, 59.6; H, 5.6; S, 10.0; OEt, 14.0%.

An attempt to distill the oil at 0.1 mm. caused decomposition and sublimation of a yellow solid.

*Halogen addition.*—The α,β-unsaturated ester (1 mmole) in carbon tetrachloride (10 ml.) was treated with bromine (1 mmole) in carbon tetrachloride (16 ml.). After 18 hours, 20% of the bromine could be titrated with sodium thiosulphate. With iodine monochloride, under similar conditions, 88% remained after a 30 minute reaction period and 75% remained unreacted after 18 hours.

*Example 20.—The preparation of ethyl β-benzoyloxymethyl-γ-benzoylthiocrotonate*

3-benzoyloxy-1-benzylthio-propan-2-one (3.14 g.), in methylene chloride (25 ml.) was treated with Wittig reagent (3.48 g.) at room temperature for 24 hours. The solvent was distilled off under reduced pressure and the residue triturated with carbon tetrachloride (12 ml.). Petroleum ether (B.P. 60–80°; 40 ml.) was added and the triphenyl phosphine oxide filtered off (1.56 g., M.P. 150–153°). The filtrate was run onto a silica column (80 g., B.D.H. material for chromatographic adsorption) and eluted with a mixture (800 ml.) of petroleum ether (30%) and carbon tetrachloride (70%). The solvent was distilled off under reduced pressure to give ethyl β-benzoyloxymethyl-γ-benzoylthio-crotonate as a colourless oil (2.01 g.). Analysis, found: C, 65.31; H, 5.23; S, 8.34%. $C_{21}H_{18}O_5S$ requires C, 65.6; H, 5.24; S, 8.34%.

A sample (0.351 g.) of this product in carbon tetrachloride (10 ml.) was treated with a 0.33 N bromine solution in carbon tetrachloride (15 ml.) at room temperature in the dark for 15 hours. Iced water (100 ml.) and 10% aqueous potassium iodide (25 ml.) were added and the liberated iodine titrated against N/10 sodium thiosulphate solution. From the titration figure (38.0 ml.) the bromine consumed represented 63% of one mole.

2% aqueous potassium iodate (5 ml.) was added and the liberated iodine titrated again.

From these two figures (38.0 ml. and 6.0 ml. respectively) it was calculated that 63% of theory for one mole of bromine had been taken up and 29.4% was due to substitution, leaving 33.6% added across the double bond.

*Example 21.—The preparation of ethyl β-benzoyloxymethyl-γ-p-methoxybenzylthio-crotonate*

The method of preparation and purification of the product were both as described above for the benzoylthio-compounds but the starting ketone was 3-benzoyloxy-1-p-methoxybenzylthio-propan-2-one.

The material obtained from the column as a colourless oil (2.79 g., 58% of theory) gave an infra-red spectrum in agreement for a structure such as ethyl-β-benzoyloxymethyl-γ-p-methoxybenzylthio-crotonate and microanalysis found C, 65.34; H, 5.93; S, 6.8. Calc. for $C_{22}H_{24}O_5S$, C, 65.97; H, 6.04; S, 8.01%.

*Example 22.—The preparation of ethyl β-benzoyloxymethyl-γ-triphenylmethylthio-crotonate*

Trityl ketone (15.57 g.) was condensed with Wittig reagent (12.0 g.) in methylene chloride (70 ml.) as described above for other ketones. The product was isolated and purified on a silica gel column as before and the fraction (16.17 g.) eluted as a colourless oil with a 1:1 mixture of carbon tetrachloride:60/80 petroleum ether (1.5 l.) gave an infra-red spectrum compatible with a structure such as ethyl-β-benzoylmethyl-γ-triphenylmethylthio-crotonate and microanalysis found: C, 75.4; H, 5.99; S, 5.7. $C_{33}H_{30}O_4S$ requires C, 75.8; H, 5.8; S, 6.1%.

I claim:

1. A compound of the formula

where R is a radical selected from the group consisting of

benzyl, cyano, acetyl, nitrobenzyl triphenylmethyl, and methoxybenzyl.

2. 3-benzoyloxy-1-thiocyano-propan-2-one.
3. 3-benzoyloxy-1-benzylthio-propan-2-one.
4. 3-benzoyloxy-1-acetylthio-propan-2-one.
5. 3-benzoyloxy-1-p-nitrobenzylthio-propan-2-one.
6. 3-benzoyloxy-1-triphenylmethylthio-propan-2-ene.
7. 3-benzoyloxy-1-methoxybenzylthio-propan-2-one.
8. A compound of the formula

where X is a halogen atom.

9. 3-benzoyloxy-1-bromo-propan-2-one.
10. A compound of the formula

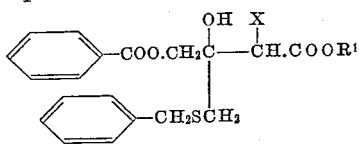

where $R^1$ is alkyl of 2–4 carbon atoms and X is a member selected from the group consisting of halo, azido and amino.

11. Ethyl 2-chloro-3-hydroxy-3-benzylthiomethyl-4-benzoyloxybutyrate.
12. Ethyl 2-bromo-3-hydroxy-3-benzylthiomethyl-4-benzoyloxybutyrate.
13. t-Butyl 2-bromo-3-hydroxy-3-benzylthiomethyl-4-benzoyloxybutyrate.
14. Ethyl 2-azido-3-hydroxy-3-benzylthiomethyl-4-benzoyloxybutyrate.
15. Ethyl 2-amino-3-hydroxy-2-benzylthiomethyl-4-benzoyloxybutyrate.

References Cited
UNITED STATES PATENTS

| | | | |
|---|---|---|---|
| 2,828,321 | 3/1958 | Bullock | 260—270 |
| 2,828,322 | 3/1958 | Bullock | 260—270 |
| 3,062,834 | 11/1962 | Fiesselmann | 260—270 |
| 3,064,036 | 11/1962 | Heininger et al. | 260—270 |

OTHER REFERENCES

Fuson et al.: "Organic Chemistry," 2nd ed., John Wiley and Sons, New York, 1954, pp. 66, 247 and 248.

Darzens: Comptes Rendus (Paris), vol. 203, pp. 1374–1376, 1936.

LORRAINE A. WEINBERGER, *Primary Examiner.*

RICHARD K. JACKSON, NICHOLAS S. RIZZO, *Examiners.*

THOMAS L. GALLOWAY, ROBERT T. BOND, *Assistant Examiners.*